(12) United States Patent
Richards

(10) Patent No.: US 9,813,635 B2
(45) Date of Patent: Nov. 7, 2017

(54) METHOD AND APPARATUS FOR AUTO EXPOSURE VALUE DETECTION FOR HIGH DYNAMIC RANGE IMAGING

(71) Applicant: Motorola Mobility LLC, Chicago, IL (US)

(72) Inventor: By-Her W Richards, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 72 days.

(21) Appl. No.: 14/833,290

(22) Filed: Aug. 24, 2015

(65) Prior Publication Data

US 2017/0064179 A1    Mar. 2, 2017

(51) Int. Cl.
*H04N 9/68* (2006.01)
*H04N 5/235* (2006.01)
*G06K 9/46* (2006.01)
*G06K 9/62* (2006.01)

(52) U.S. Cl.
CPC ......... *H04N 5/2355* (2013.01); *G06K 9/4642* (2013.01); *G06K 9/4661* (2013.01); *G06K 9/6215* (2013.01); *H04N 5/2356* (2013.01)

(58) Field of Classification Search
None
See application file for complete search history.

(56) References Cited

U.S. PATENT DOCUMENTS

2012/0008040 A1* 1/2012 Miyata ................. H04N 5/2353
348/362

FOREIGN PATENT DOCUMENTS

EP    2763396 A1    8/2014

* cited by examiner

*Primary Examiner* — Stephen Coleman
(74) *Attorney, Agent, or Firm* — Matthew C. Loppnow; Watson Intellectual Property Group

(57) ABSTRACT

A method and apparatus for auto exposure value detection for High Dynamic Range (HDR) Imaging. An image can be captured as a captured image at a capture exposure. The exposure of a current iteration of the image can be changed by at least a fraction of an exposure value. A changed exposure image can be captured at the changed exposure value. A difference between an exposure data metric of the current iteration of the changed exposure image and an exposure data metric of a previous iteration of the image can be ascertained. The difference between the exposure data metric of the current iteration of the changed exposure image and the exposure data metric of the previous iteration of the image can be compared to a difference threshold. Changing the exposure value, capturing the changed exposure image, ascertaining the difference, and comparing the difference can be repeated when the difference between the exposure data metric of the current iteration of the changed exposure image and the exposure data metric of the previous iteration of the image exceeds the difference threshold.

26 Claims, 16 Drawing Sheets

METHOD AND APPARATUS FOR AUTO EXPOSURE VALUE DETECTION FOR HIGH DYNAMIC RANGE IMAGING

BACKGROUND

1. Field

The present disclosure is directed to a method and apparatus for auto exposure value detection for High Dynamic Range (HDR) Imaging. More particularly, the present disclosure is directed to determining optimal exposure values for high and low exposure images to generate an HDR image.

2. Introduction

Presently, exposure determines how much light gets to film or a camera sensor. All still cameras have at least two fundamental controls for this: lens aperture and shutter speed. The combination of the two is the Exposure Value (EV) used for exposure. Exposure Value also has second equivalent definition. The second definition is how much exposure is required by the combination of subject luminance (e.g., how bright it is) and film speed. EV is also called Additive Photographic Exposure (APEX). Some cameras, such as those on smartphones and tablets, cannot change the lens aperture.

Any camera can actually capture a vast dynamic range—just not in a single image. By varying the shutter speed, aperture size, and/or camera sensor gain, which is equivalent to the ISO speed, most digital cameras can change how much light they let in to an image. HDR imaging utilizes this characteristic by creating images composed of multiple exposures to cover a larger dynamic range. Due to a limitation of processing time for most real-time cases on a camera an HDR image is created by using source images acquired at the exposure values: normal exposure, high exposure, and low exposure. An HDR image can also be created using two source images acquired at two exposure values.

Recently, a new kind of HDR imaging is available on a Complementary Metal-oxide Semiconductor (CMOS) camera sensor. On one captured image, half of the pixels of the camera sensor are exposed shorter, called the short exposure pixels and the other half of the pixels are exposed longer, called the long exposure pixels. This feature is equivalent to taking two input images simultaneously and is used to generate an HDR image on the fly. The CMOS sensor industry has used "iHDR" (interlaced or interleaved HDR) or "zigzag HDR" (various mosaic patterns) to describe this new feature.

Unfortunately, all of the current HDR techniques do not provide a method for determining the optimal EV for the high and low exposure images, used to generate an HDR image.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
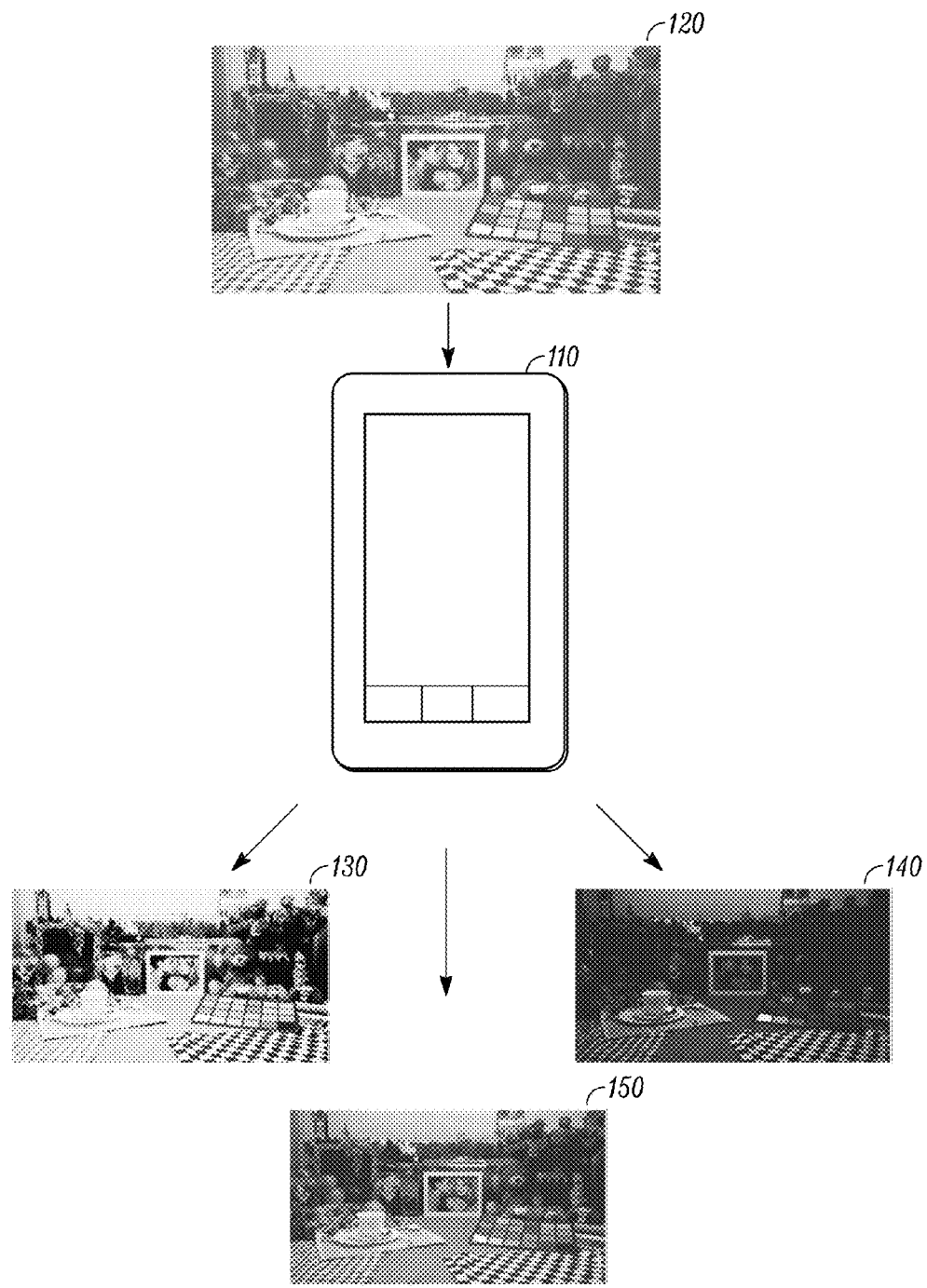
FIG. 1 is an example illustration of a user device that can capture different exposure images of a scene to generate an HDR image from the combination of the different exposure images according to a possible embodiment.

Embodiments can provide a method and apparatus to find the optimal Exposure Value (EV) for an image capture at high exposure and the optimal EV for the capture at low exposure in High Dynamic Range (HDR) imaging per scene. The algorithm can be utilized in 3-capture HDR, 2-capture HDR, sensor HDR, or other forms of HDR. For iHDR or zigzag HDR in the sensor HDR, an optimal combination of the short and long exposure times can be chosen dynamically per scene.

According to a possible embodiment, an image can be captured as a captured image at a capture exposure value. The capture exposure value can be determined by an auto exposure algorithm for the current scene. To find an upper limit or a lower limit of exposure value for the dynamic range of the current scene, the exposure of a current iteration of the image can be changed by at least a fraction of an exposure value. A changed exposure image can be captured at the changed exposure value. A difference between an exposure data metric of the current iteration of the changed exposure image and an exposure data metric of a previous iteration of the image can be ascertained. The difference between the exposure data metric of the current iteration of the changed exposure image and the exposure data metric of the previous iteration of the image can be compared to a difference threshold. Changing the exposure, capturing the changed exposure image, ascertaining the difference, and comparing the difference can be repeated when the difference between the exposure data metric of the current iteration of the changed exposure image and the exposure data metric of the previous iteration of the image exceeds the difference threshold. According to a possible implementation, the exposure value can be increased gradually when searching for an upper limit of the exposure value. Also, the exposure value can be decreased gradually when searching for the lower limit of the exposure value.

For example, embodiments can provide a method and apparatus for auto exposure value detection for High Dynamic Range (HDR) Imaging. An image can be captured as a captured image at a capture exposure value, determined by an auto exposure algorithm for the current scene. To find an upper limit or a lower limit of exposure value for the dynamic range of the current scene, the exposure of a current iteration of the image can be changed by at least a fraction of an exposure value. The exposure value can be increased gradually when searching for the upper limit. The exposure value can be decreased gradually when searching for the lower limit. An iteration scheme is described in the following: A changed exposure image can be captured at the changed exposure value. A difference between an exposure data metric of the current iteration of the changed exposure image and an exposure data metric of a previous iteration of the image can be ascertained. The difference between the exposure data metric of the current iteration of the changed exposure image and the exposure data metric of the previous iteration of the image can be compared to a difference threshold. Changing the exposure value, capturing the changed exposure image, ascertaining the difference, and comparing the difference can be repeated when the difference between the exposure data metric of the current iteration of the changed exposure image and the exposure data metric of the previous iteration of the image exceeds the difference threshold. After the upper limit, and the lower limit of exposure value for the current scene are determined by this iteration scheme, an HDR image can be generated by combining the image acquired by the exposure value that is determined by an auto exposure algorithm and at least one of the following images: an image captured by using the upper limit of exposure value and the other image captured by using the lower limit of exposure value. For example, the images of the HDR image can be captured in a sequence after the upper and lower limits are determined. The images captured in the sequence can include an image captured at the original normal exposure value and at least one image captured at a different exposure value determined by the iteration scheme. For a 3-capture HDR, the images captured in the sequence can include an image captured using the original normal exposure value, an image captured using the upper limit of the exposure value, and an image captured using the lower limit of the exposure value.

FIG. 1 is an example illustration of a user device 110 that can capture different exposure images 130, 140, and 150 of a scene 120 to generate an HDR image from the combination of the different exposure images 130, 140, and 150 according to a possible embodiment. It should be noted that, for illustration purposes, the images in the drawings are only binary image approximations of actual images that would be captured using a digital camera and some details of the actual images may be missing from the images in the drawings. However, one of ordinary skill in the art can readily grasp the concepts of the present disclosure regardless of the amount of detail in the drawing images. The user device 110 can be any device that can capture a scene as an image. For example, the user device 110 can be a smartphone, a DSLR camera, a point and shoot camera, a wireless terminal, a portable wireless communication device, a cellular telephone, a flip phone, a personal digital assistant, a personal computer, a selective call receiver, a tablet computer, or any other device that has a camera that can capture a scene as an image.

For an HDR image using three source images, after an image of a scene, such as the scene 120, is captured at a normal exposure, such as an initial exposure, as a normal exposure image 150, a search can be performed for an optimal EV step at low exposure where an initial guess can be set to an EV step, which can be slightly lower than the EV step of the normal exposure. A search can also be performed for the optimal EV step at high exposure where an initial guess can be set to an EV step, which can be slightly higher than the EV step of the normal exposure. For example, an interval can be selected as ⅓ or ½ EV step, depending on the required speed of convergence. Given the maximum allowed range of EV steps per camera device, the search for the optimal EV step at low exposure can end at the maximum allowed negative EV step or until the optimal low exposure is reached. The search for the optimal EV step at high exposure can end at the maximum allowed positive EV step or until the optimal high exposure is reached. An iteration scheme can be used to search for the optimal EV per case. After the optimal EV steps are determined, a normal exposure image 150, a high exposure image 130, and a low exposure image 140 can be combined to generate an HDR image.

Two or more data metrics can be used to implement this iteration scheme. For example, metrics can include metric of a histogram in a luminance channel, metric of a binary image in a luminance channel, and/or other metrics. A histogram in a luminance channel can be generated from the luminance channel of a color space. The RGB or sRGB color space can be converted to another color space with a luminance channel. For example, a luminance channel can be Y channel in YCbCr color space, Y channel in CIE XYZ color space, or L* channel in CIE L*a*b* color space. All the histograms discussed in the present embodiments can mean a histogram in a luminance channel.

Figure 2:
FIG. 2 is an example image of a capture of a scene according to a possible embodiment.
Figure 3:
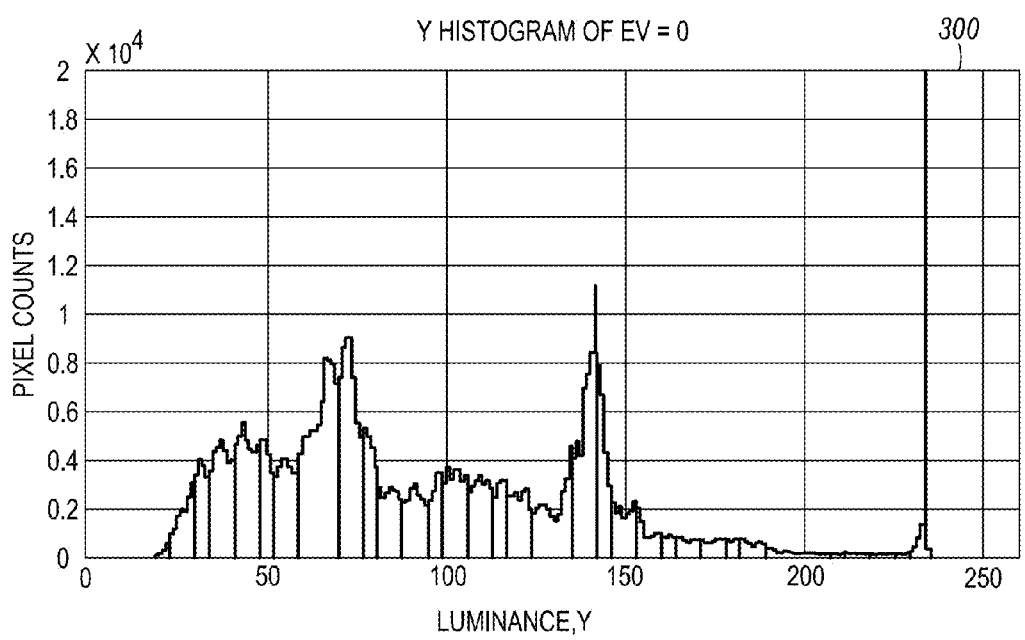
FIG. 3 is an example histogram of the image of FIG. 2 according to a possible embodiment.
Figure 4:
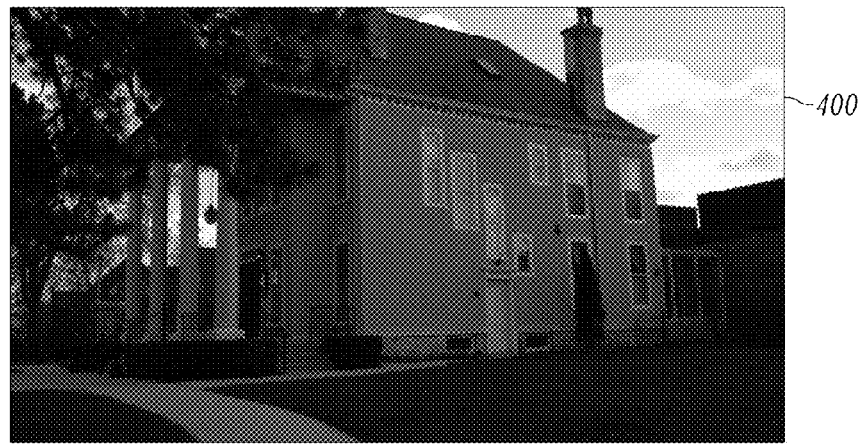
FIG. 4 is an example image of a capture of a scene at low exposure according to a possible embodiment.
Figure 5:
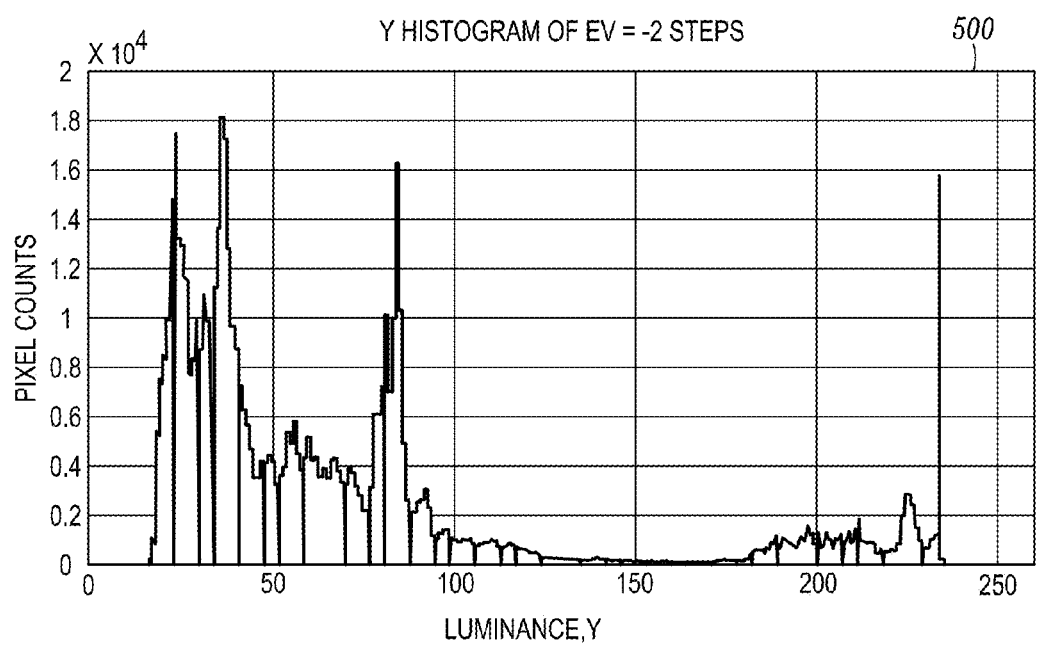
FIG. 5 is an example histogram of the image of FIG. 4 according to a possible embodiment.

In general, the histogram of a real world scene has a wider dynamic range than what a single digital image can capture. Therefore, if there is a very bright area, such as an area with lamps or sun, in the scene, then the histogram of a capture at normal exposure can have a high clipped value at the right end. FIG. 2 is an example image 200 of a capture of a scene and FIG. 3 is an example histogram 300 of the image 200 showing the high clipped value at the right end according to a possible embodiment. In this case, a capture at low exposure of the same scene can recover signals at the very bright area and have a smaller clipped value at the right end. FIG. 4 is an example image 400 of a capture of a scene at low exposure and FIG. 5 is the histogram of the image 400 according to a possible embodiment where the dark areas in the example image 400 would have more detail in actual practice. A comparison of the histogram 300 with the histogram 500 shows that pixels on right end of the histogram 300 are squeezed into a narrower region than the histogram 500. The histogram 300 shows that a lot of pixels on the normal exposure image 200 are clipped at a certain value at the right end. The goal of an optimal negative EV step is to lower the intensity level of all the pixels on the low exposure image, so that the majority of pixels, such as 80%, for example, with the clipped value at the right end on the normal exposure image can be just lower than that clipped value of the same scene, as shown in the histogram 500. For example, a lot of pixels on a blue sky area are clipped to white in the normal exposure image 200. The low exposure image 400 of the same scene shows that the majority of pixels on the blue sky are blue (shown as grey for illustration purposes). An optimal negative EV step for the low exposure image avoids pixel values that are clipped on the blown-out area of the normal exposure image.

Figure 6:
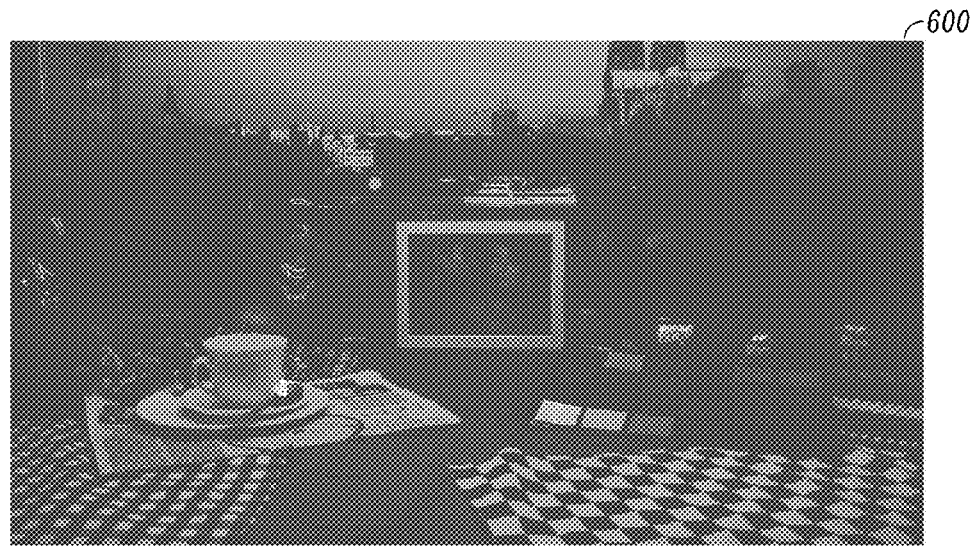
FIG. 6 is an example image of a scene according to a possible embodiment.
Figure 7:
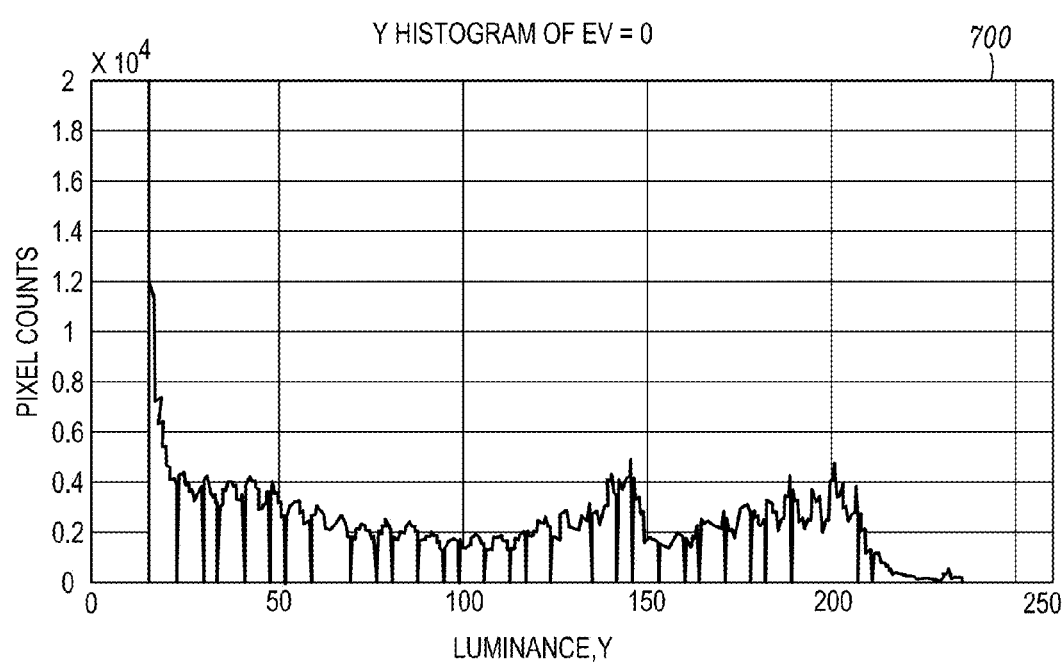
FIG. 7 is an example histogram of the image of FIG. 6 according to a possible embodiment.
Figure 8:
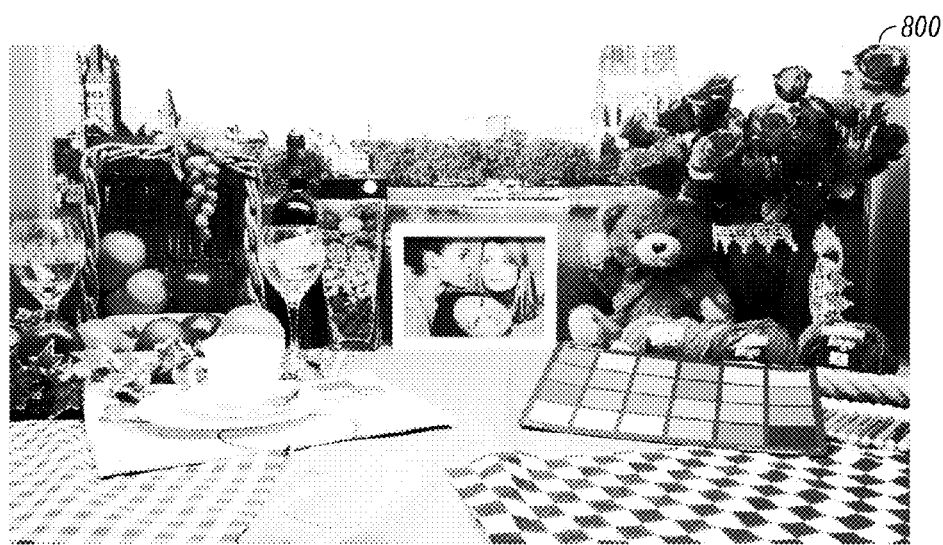
FIG. 8 is an example image of a scene according to a possible embodiment.
Figure 9:
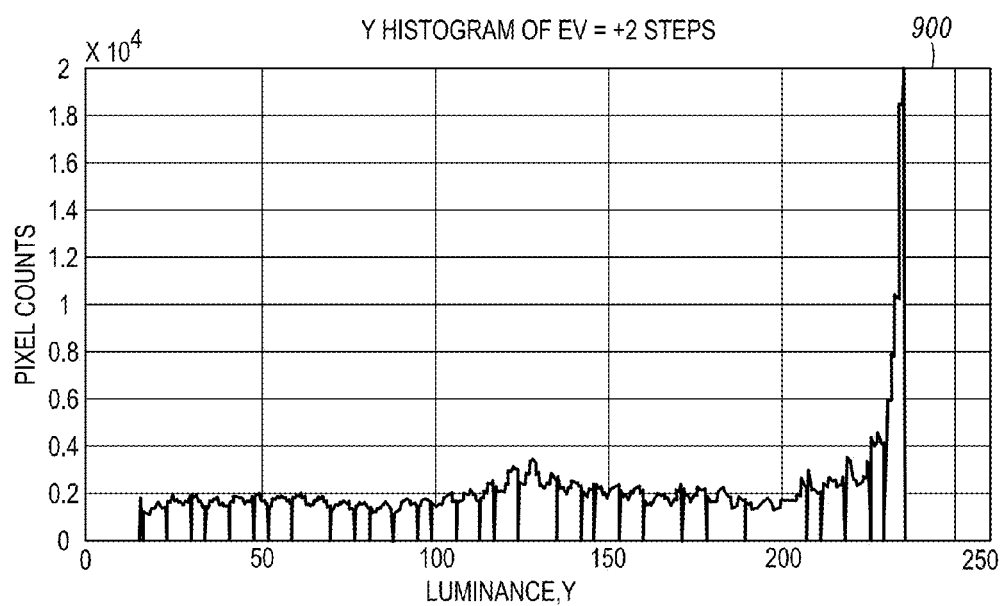
FIG. 9 is an example histogram of the image of FIG. 8 according to a possible embodiment.

FIG. 6 is an example image 600 of a scene and FIG. 7 is an example histogram 700 of the image 600 according to a possible embodiment. If there is a very dark area, such as shadows or black objects, in the scene shown in image 600, then the histogram 700 of a capture at normal exposure may have a clipped value at the left end. FIG. 8 is an example image 800 of a scene and FIG. 9 is an example histogram of the image 800 according to a possible embodiment. In this case, a capture at high exposure of the same scene shown in the image 800 can recover signals in the shadow areas and have a smaller clipped value at the left end shown in the histogram 900. At some scenes with non-reflective black objects, a dark area may still stay dark on an image at high exposure. The histogram 700 shows that a lot of pixels on the normal exposure image are clipped at a certain value at the left end. The goal of an optimal positive EV step is to increase the intensity level of all the pixels on the high exposure image, so that the majority of pixels, such as 80%, for example, with the clipped value at the left end on the normal exposure image will be just higher than that clipped value at the left end at the same scene, as shown in the histogram 900. An optimal positive EV step for the high exposure image avoids pixel values that are clipped on the shadow area of the normal exposure image.

Figure 10:
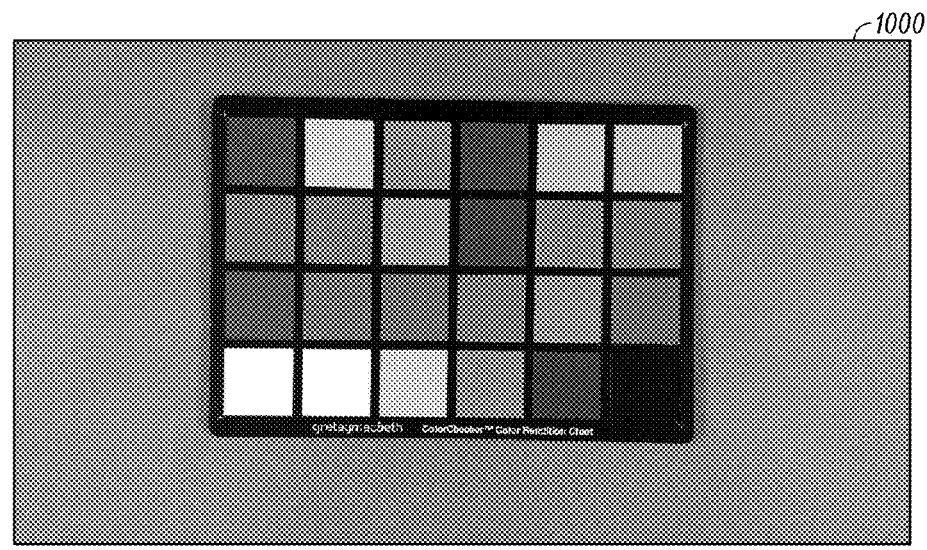
FIG. 10 is an example image of a scene according to a possible embodiment.
Figure 11:
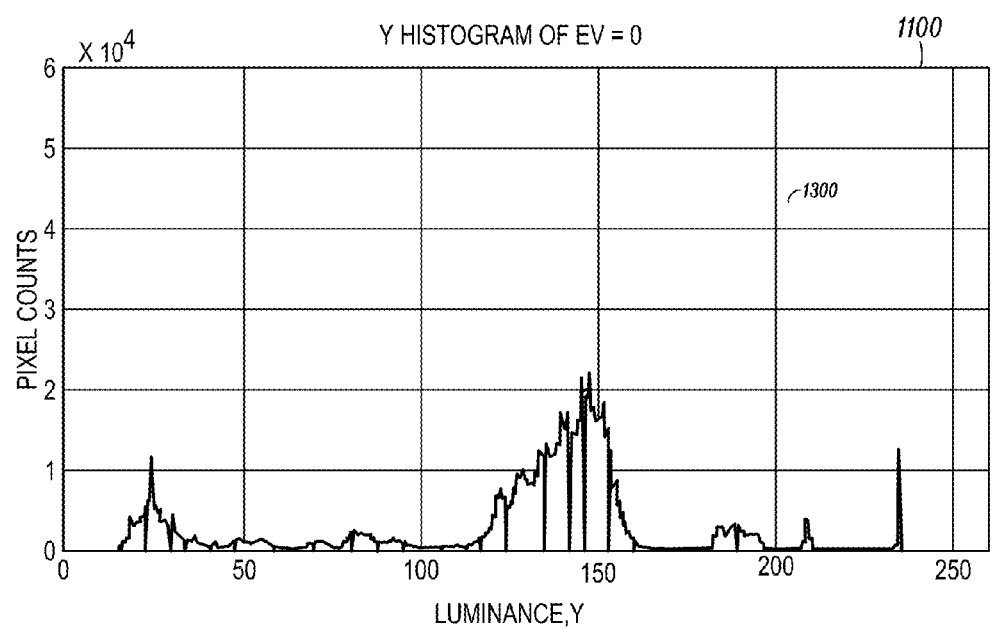
FIG. 11 is an example histogram of the image of FIG. 10 according to a possible embodiment.

FIG. 10 is an example image 1000 of a scene and FIG. 11 is an example histogram 1100 of the image 1000 according to a possible embodiment. In some scenes, such as in image 1000, with a narrow dynamic range, there no a clip in either side of the histogram 1100 at normal exposure. In this case, a single capture can be sufficient to cover the whole dynamic range of scene instead of using a 2 or 3-capture HDR image.

For thresholding of a binary image in a luminance channel, an image in a luminance channel can be generated from the luminance channel of a color space. The RGB or sRGB color space can be converted to another color space with a luminance channel. For example, a Y channel in YCbCr color space, a Y channel in CIE XYZ color space, or an L* channel in CIE L*a*b* color space can be used. All the histograms discussed in the present embodiments can mean the histogram in a luminance channel. Given a threshold value, an image can be segmented into a binary image. For example, for an 8-bit image with pixel values from 0 to 255, a low-threshold binary image can be generated by applying a low threshold value, such as 16. All the pixel values above 16 can then be set to 1 and displayed in a white color, and the other pixels can be set to 0 and displayed in a black color.

Figure 12:
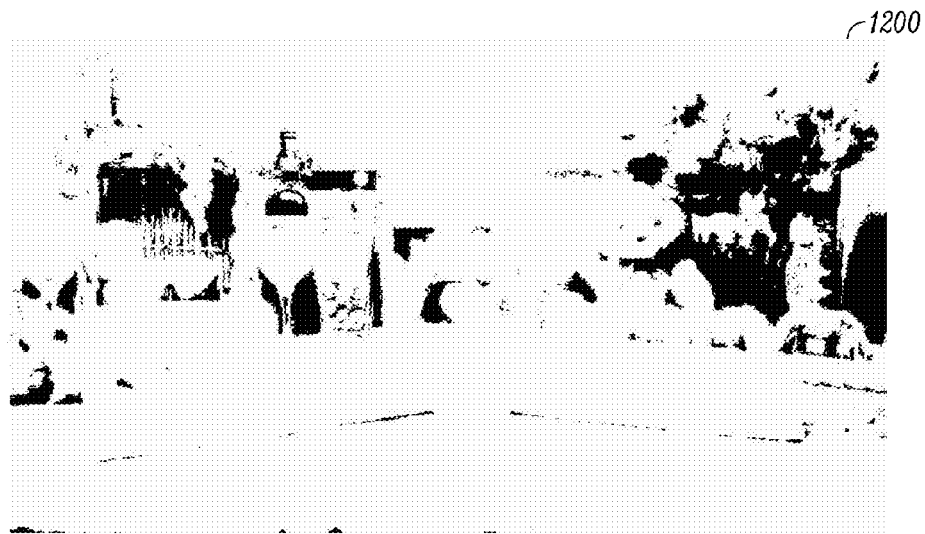
FIG. 12 is an example low-threshold binary image of the image of FIG. 6 according to a possible embodiment.
Figure 13:
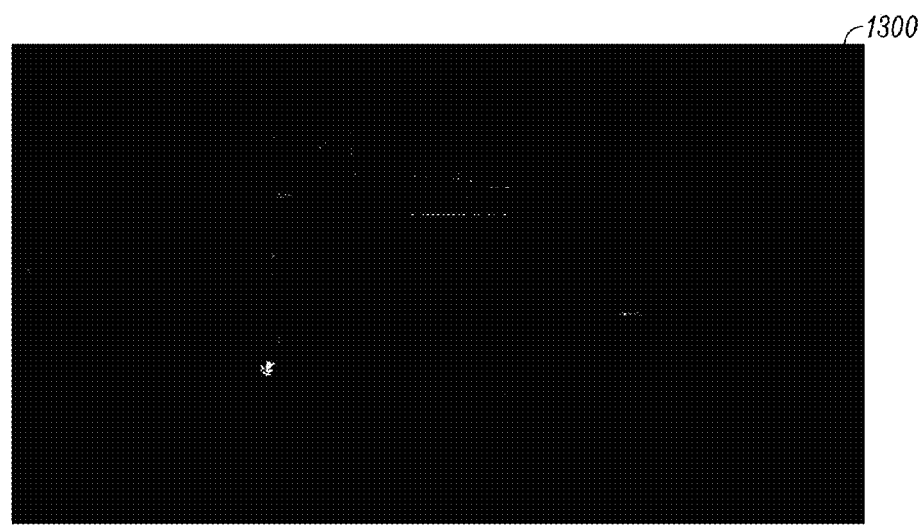
FIG. 13 is an example high-threshold binary image of the image of FIG. 6 according to a possible embodiment.

FIG. 12 is an example low-threshold binary image 1200 of the image 600 according to a possible embodiment. A high-threshold binary image can be generated by applying a high threshold value, such as 233. All the pixel values above 233 can be set to 1 and displayed in a white color, and the other pixels can be set to 0 and displayed in a black color. FIG. 13 is an example high-threshold binary image 1300 of the image 600 according to a possible embodiment.

Figure 14:
FIG. 14 is an example high-threshold binary image of the image of FIG. 2 according to a possible embodiment.
Figure 15:
FIG. 15 is an example high-threshold binary image of the image of FIG. 4 according to a possible embodiment.

FIG. 14 is an example high-threshold binary image 1400 of the image 200 according to a possible embodiment. If there is a very bright area, such as a sky on a sunny day in the scene, then the high-threshold binary image of a capture at normal exposure can have a big white region. FIG. 15 is an example high-threshold binary image 1500 of the image 400 according to a possible embodiment. In this case, a capture at low exposure of the same scene can recover signals at the very bright area and have discrete white dots or white regions, such as white clouds on the high-threshold binary image. The image 1400 shows that a lot of pixels on the sky area of the normal exposure image are clipped at a certain value. The goal of an optimal negative EV step is to lower the intensity level of all the pixels on the low exposure image, so that a noticeable region of pixels with the clipped value on the normal exposure image will be just lower than that clipped value of the same scene as shown in the image 1500. For example, a lot of pixels on the sky area are clipped to white on the normal exposure image 200. The image 400 shows that the majority of pixels on the blue sky are blue (shown as grey for illustration purposes), not white, on the low exposure image of the same scene. An optimal negative EV step for the low exposure image can avoid pixel values that are clipped in the blown-out area of the normal exposure image 400.

Figure 16:
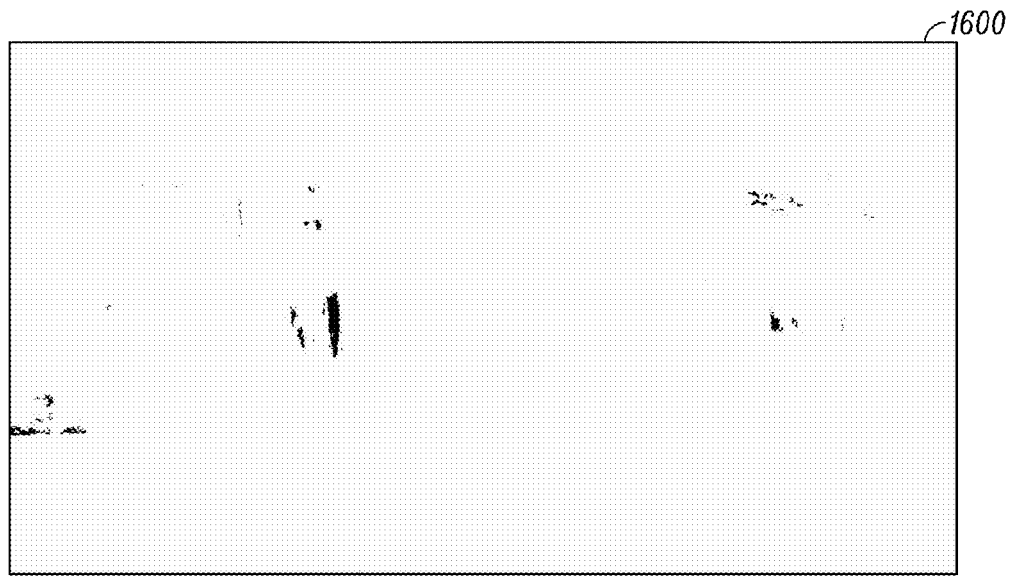
FIG. 16 is an example low-threshold binary image of the image of FIG. 8 according to a possible embodiment.

As shown in the low-threshold image 1200 derived from the normal exposure image 600, if there is a very dark area, such as a shadow or a black object in the scene, then the low-threshold binary image of a capture at normal exposure can have a big black area. FIG. 16 is an example low-threshold binary image 1600 derived from the high exposure image 800 relating to the normal exposure image 600 according to a possible embodiment. In this case, a capture at high exposure of the same scene can recover signals in the shadow area, and have discrete black dots or black regions, such as for black objects, on the low-threshold binary image. The low-threshold binary image 1200 shows that a lot of pixels on the shadow areas of the normal exposure image are clipped at a certain value. An optimal positive EV step can increase the intensity level of all the pixels on the high exposure image so that a noticeable region of pixels with the clipped value on the normal exposure image will be just higher than that clipped value at the same scene, as shown in the low-threshold binary image 1600. For example, a lot of pixels on the shadow area are clipped to black on the normal exposure image 600. The image 800 shows that the majority of pixels on the shadow area are not black on the high exposure image of the same scene. An optimal positive EV step for the high exposure image can avoid pixel values that are clipped on the shadow area of the normal exposure image.

Figure 17:
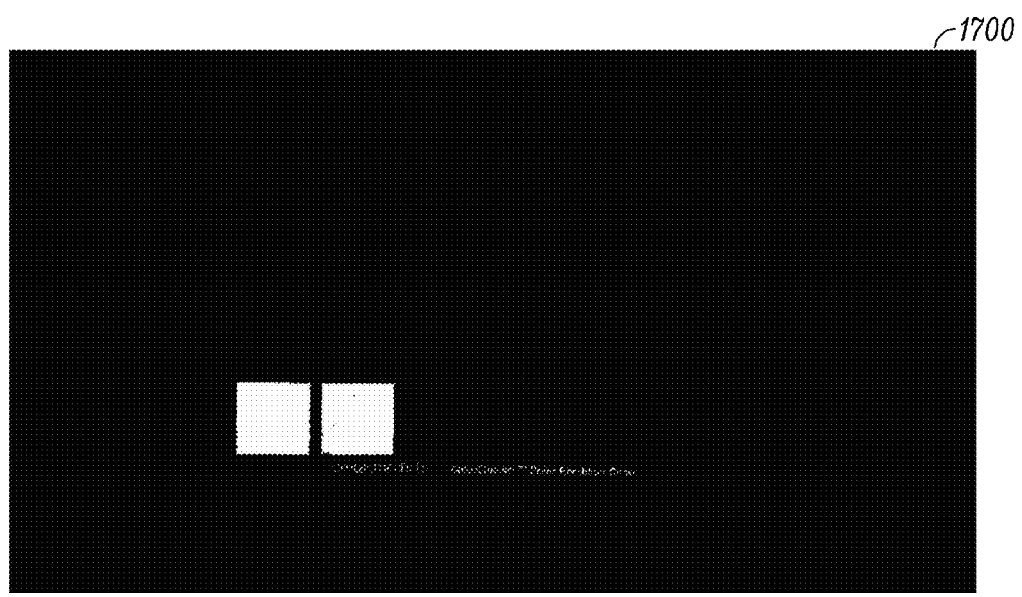
FIG. 17 is an example high-threshold binary image of the image of FIG. 10 according to a possible embodiment.
Figure 18:
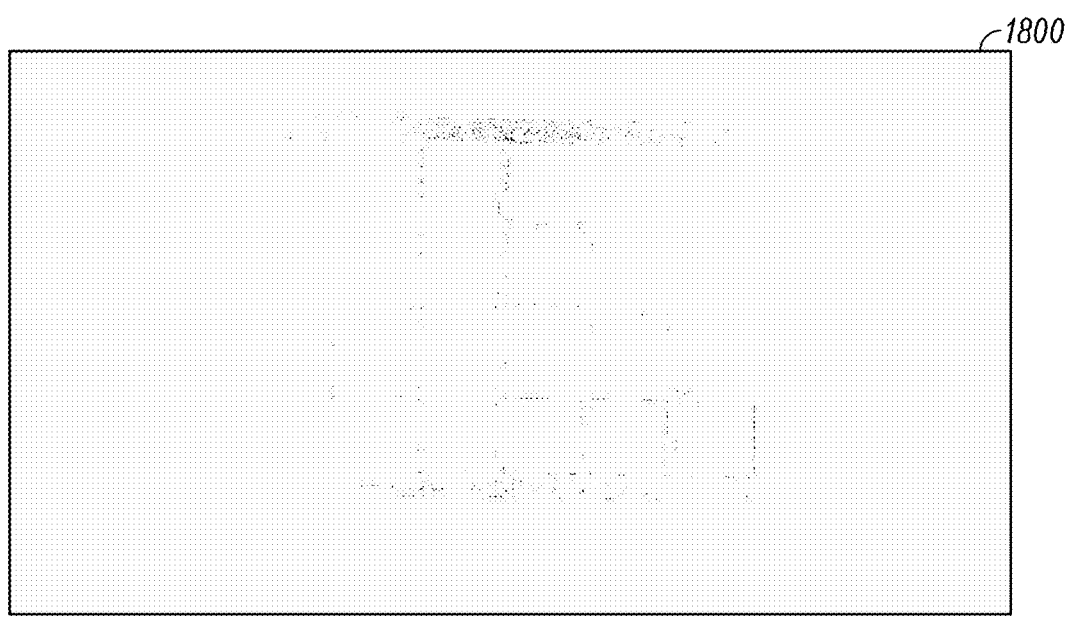
FIG. 18 is an example low-threshold binary image of the image of FIG. 10 according to a possible embodiment.

FIG. 17 is an example high-threshold binary image 1700 derived from the normal exposure image 1000 according to a possible embodiment. FIG. 18 is an example low-threshold binary image 1800 derived from the normal exposure image 1000 according to a possible embodiment. At some scenes with a narrow dynamic range, the high-threshold binary image 1700 can have white dots or areas corresponding to white objects at scene and the low-threshold binary 1800 image can have black dots or areas corresponding to black objects at scene. In this case, a single capture can be sufficient to cover the dynamic range at scene, instead of a 2 or 3-capture HDR image.

As an example of how to search for an optimal EV at low exposure, first, a data metric can be reviewed at normal exposure on preview frames. For a histogram of a preview frame, if there is not a very high clipped value at the right end, then a search for an optimal EV at low exposure may not be necessary. For a high-threshold binary image, if there is not any noticeable white area, then a search for an optimal EV at low exposure also may not be necessary because the scene does not have any very bright areas.

Second, at normal exposure on preview frames, if there is a very high clipped value at the right end of the histogram, or there is any noticeable white area on the high-threshold binary image, a search for an optimal EV at low exposure can be performed on preview frames. For example, the normal exposure image can be taken at EV=0 step, and an interval can be selected as ⅓ EV steps. An initial guess can be set to −⅓ step. An iteration scheme can be used to search for the optimal EV on preview frames. Per iteration, the requirements can be checked to determine if they are met or not. The requirements can be to have the difference between the previous and current iterations lower than a threshold of a data metric. If a histogram of a preview frame is used for iterations, the high clipped value at the right end can be checked to determine if it is decreasing per iteration. If the thresholding of a binary image of a preview frame is used for iterations, the white area can be checked to determine if it has shrunk per iteration. Per iteration, if the difference between the previous histogram or the previous binary image and the current histogram or the current binary image is higher than a threshold, then the iteration process can continue by decreasing the EV step by another ⅓ step. If the difference is lower than a threshold, then the iteration process can stop. At this point, the optimal EV step for low exposure can be determined to be found. If the iteration never converges, then the maximum allowed negative EV step for the camera device can be selected as the optimal EV step for low exposure.

As an example of how to search for an optimal EV at high exposure, first, data metric can be reviewed at normal exposure on preview frames. For histogram of a preview frame, if there is not a very high clipped value at the left end, then a search for an optimal EV at high exposure may not be necessary. For a low-threshold binary image, if there is not any noticeable black area, then a search for an optimal EV at high exposure may also not be necessary because the scene does not have any very dark areas.

Second, at normal exposure on preview frames, if there is a very high clipped value at the left end of the histogram, or there is any noticeable black area on the low-threshold binary image, a search for an optimal EV at high exposure can be performed on preview frames. For example, the normal exposure image can be taken at EV=0 step, and an interval can be selected as ⅓ EV steps. An initial guess can be set to +⅓ step. An iteration scheme can be used to search for the optimal EV on preview frames. Per iteration, the requirements can be checked to determine if they are met or not. The requirements can be to have the difference between the previous and current iterations lower than a threshold of a data metric. If histogram of a preview frame is used for iterations, we check if the high clipped value at the left end can be checked to determine if it is decreasing per iteration. If the thresholding of a binary image of a preview frame is used for iterations, the black area can be checked to determine if it has shrunk per iteration. Per iteration, if the difference between the previous histogram or the previous binary image and the current histogram or the current binary image is higher than a threshold, then the iteration process can continue by increasing the EV step by another ⅓ step. If the difference is lower than a threshold, then the iteration process can stop. At this point, the optimal EV step for high exposure can be determined to be found. If the iteration never converges, then the maximum allowed positive EV step for the camera device can be selected as the optimal EV step for high exposure.

If an image understanding logic, such as face detection, object recognition, and/or other image understanding logic, is available on a camera device then its results can assist the search for an optimal EV at low or high exposure. For example, if face detection logic outputs a bounding box to represent each face region, then the luminance histogram or the binary image can be generated by using only pixels inside those bounding boxes, if the total number of pixels in all the bounding boxes exceeding a certain threshold. This can mean that faces should be well-exposed, if face regions are dominant at a scene. The same iteration scheme described in the low or high exposure search can be used to search for an optimal EV, respectively.

As another example, for example, an object recognition algorithm to detect white or black objects can be implemented on a sensor in HDR mode, which can generate the high exposure and low exposure pixels at the same time. This object recognition logic can output a bounding box to represent a white object or black object in a scene. Then, the luminance histogram or the binary image can be generated by using only pixels that exclude those bounding boxes, if the total number of pixels in all the bounding boxes exceeds a certain threshold. Usually, a white object in a scene may cause a high clipped value at the right end of a histogram or a big white area on the high-threshold binary image, and a black object in a scene may cause a high clipped value at the left end of a histogram, or a big black area on the low-threshold binary image. Such pixels in the bounding boxes may interfere with the search for an optimal EV at low or high exposure.

Figure 19:
FIG. 19 is an example luminance RAW image according to a possible embodiment.
Figure 20:
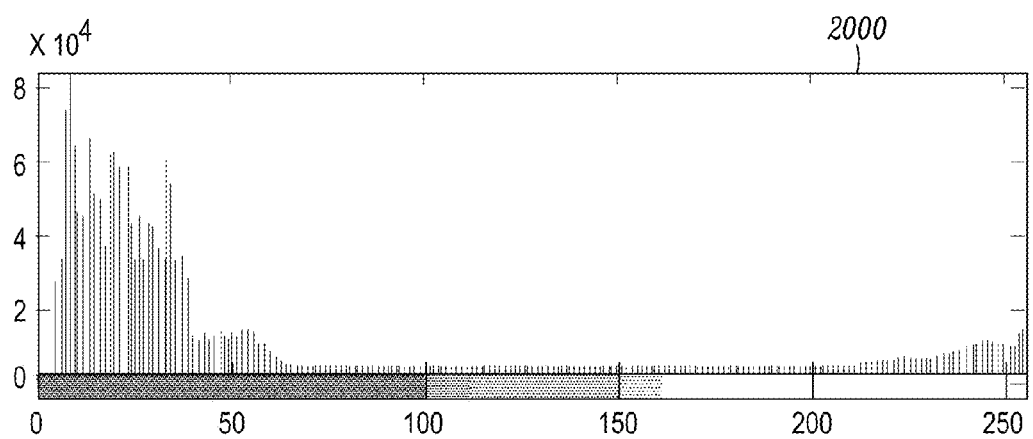
FIG. 20 is an example luminance histogram in a linear gamma domain of the image of FIG. 19 according to a possible embodiment.

FIG. 19 is an example luminance RAW image 1900 according to a possible embodiment. FIG. 20 is an example luminance histogram 2000 in a linear gamma domain, of the image 1900 of FIG. 19, according to a possible embodiment. Most of example images in the disclosed embodiments are for RGB images in a non-linear gamma domain. Embodiments also work for the luminance RAW images in a linear gamma domain. This can allow for faster processing because the image does not have to be converted into another format, such as JPG, before implementing the embodiments. In the histogram 2000, there is a noticeable group of pixels near the right end. If the pixels were clipped at 200 in pixel luminance value instead of 255, then a high clipped value can be observed at the right end. This scene is similar to the image 200, which is an RGB image at non-linear gamma domain.

Figure 21:
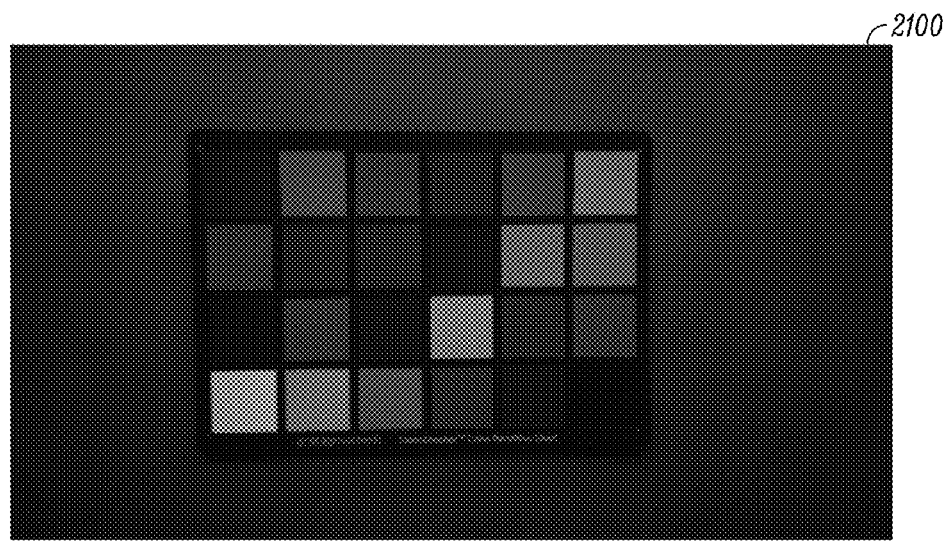
FIG. 21 is an example luminance RAW image according to a possible embodiment.
Figure 22:
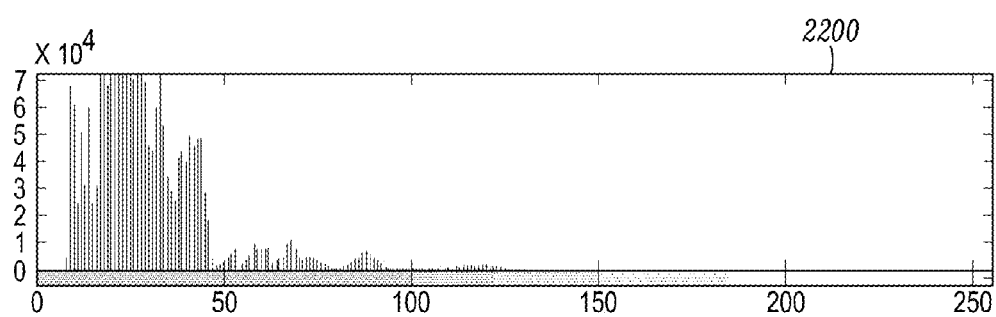
FIG. 22 is an example luminance histogram in a linear gamma domain of the image of FIG. 21 according to a possible embodiment.

FIG. 21 is an example luminance RAW image 2100 according to a possible embodiment. FIG. 22 is an example luminance histogram 2200 in a linear gamma domain, of image 2100 of FIG. 21, according to a possible embodiment. In the histogram 2200, there is not a noticeable clipped value at either end. Thus, this scene in the image 2100 has a narrow dynamic range. The conclusion is the similar as that for the luminance histogram 1100 of an RGB image at non-linear gamma domain.

For a 2-capture HDR image, a variation of the 3-capture HDR process can be used. If the normal exposure image frame in the preview mode has a narrow dynamic range, then a single capture can be sufficient. If the normal exposure image has a dynamic range that exceeds the range of a single capture, a determination can be made as to whether a low exposure or a high exposure capture can be used, because this is a 2-capture HDR. Depending on the scene, of the two input images (or 2 groups of pixels), one image can be at normal exposure and one image can be at low exposure if the normal exposure image frame at preview mode is over exposed. Alternately, of the 2 input images one image can be at normal exposure and one image can be at high exposure if the normal exposure image frame in the preview mode is under exposed and/or has a lot of shadow areas. According to a possible implementation, for bright light or outdoor scenes, an optimal EV can be searched for a low exposure first. The previous embodiments can be used for the search for an optimal EV at low exposure on preview frames. If a low exposure capture is not required, such as when there are no very bright areas in the scene, then an optimal EV can be searched for at high exposure. The previous embodiments can be used for the search for an optimal EV at high exposure on preview frames. According to another possible implementation for low light scenes, an optimal EV at high exposure can be searched for on preview frames first. The previous embodiments can be used for the search for an optimal EV at high exposure on preview frames. If a high exposure capture is not required, such as when there are no very dark areas in the scene, then a search can be performed for an optimal EV at low exposure next. The previous embodiments can be used for the search for an optimal EV at low exposure on preview frames. According to both implementations, the two captures, such as normal and high exposure images or normal and low exposure images, can then be set for the 2-capture HDR image.

For a sensor HDR mode, such as iHDR or zigzag HDR, a variation of the 2-capture HDR process can also be used. The camera sensor can first be set in a normal mode, such as a non-HDR mode, to check if the normal exposure image at preview mode has a narrow dynamic range or not. If the image has a narrow dynamic range, then a capture at normal node is sufficient. If not, then a determination can be made as to whether a low exposure capture or a high exposure capture can be used, because there are only two groups of pixels on such a camera sensor: the long and short exposure pixels. Depending on the scene, the 2 groups of pixels can be at normal exposure and at low exposure if the normal exposure image is over exposed. Alternately, the 2 groups of pixels can be at normal exposure and at high exposure if the normal exposure image is under exposed or has a lot of shadow areas.

According to a possible implementation, the camera sensor can be set to HDR mode on preview frames. For bright light or outdoor scenes, a search can be made for an optimal EV at low exposure first. The previous embodiments can be used for the search for an optimal EV at low exposure on preview frames. The long exposure pixels can be set to normal exposure and the EV can be iterated on the short exposure pixels per preview frame. One histogram or binary image can be generated from the short exposure pixels and the other one from the long exposure pixels. If a low exposure capture is not required, such as when there are no very bright areas at scene, then a search can be made for an optimal EV at high exposure next. The previous embodiments can be used for the search for an optimal EV at high exposure on preview frames. The short exposure pixels can be set to normal exposure and the EV can be iterated on the long exposure pixels per preview frame.

According to another possible embodiment, the camera sensor can be set to HDR mode on preview frames. For low light scenes, a search can be made for an optimal EV at high exposure first. The previous embodiments can be used for the search for an optimal EV at high exposure on preview frames. The short exposure pixels can be set to normal exposure and the EV can be iterated on the long exposure pixels per preview frame. One histogram or binary image can be generated from the short exposure pixels and the other one from the long exposure pixels. If a high exposure capture is not required, such as when there are no very dark areas in the scene, then a search can be made for an optimal EV at low exposure next. The previous embodiments can be used for the search for an optimal EV at low exposure on preview frames. The long exposure pixels can be set to normal exposure and the EV can be iterated on the short exposure pixels per preview frame.

For iHDR or zigzag HDR, the long exposure pixels and short exposure pixels on the same camera sensor can share the same sensor gain, so only the exposure time may only be adjustable to support various EV steps. If EV=0 for the normal exposure image, the EV=+2 steps at high exposure means to increase the exposure time by 4 times ($2^{\wedge}EV=4$). The EV=−2 steps at low exposure means to decrease the exposure time by 4 times ($2^{\wedge}EV=\frac{1}{4}$). According to a possible implementation, if normal exposure and low exposure are chosen, then the normal exposure pixels can be the long exposure pixels and the low exposure pixels are the short exposure pixels. If a camera sensor only allows for setting the exposure time for the long exposure pixels and the relative exposure ratio between 2 groups of pixels, then the exposure time can be set at normal exposure for the long exposure pixels. Then $2^{\wedge}$[EV at normal exposure−EV at low exposure] can be used to derive a proper exposure ratio between the long exposure pixels and short exposure pixels. According to another possible implementation, if normal exposure and high exposure are chosen, then the normal exposure pixels can be the short exposure pixels and the high exposure pixels can be the long exposure pixels. If a camera sensor only allows for setting the exposure time for the long exposure pixels and the relative exposure ratio between 2 groups of pixels, then the exposure time at high exposure can be set to the long exposure pixels. Then $2^{\wedge}$[EV at high exposure−EV at normal exposure] can be used to derive a proper exposure ratio between the long exposure pixels and short exposure pixels.

The exposure time of long exposure pixels or short exposure pixels for iHDR or zigzag HDR can be determined to prevent from flicker under indoor light sources. At 60-Hz power frequency region, the exposure time can be a multiple of 8.33 ms to avoid flicker under indoor light sources. At 50-Hz power frequency region, the exposure time can be a multiple of 10 ms to avoid flicker under indoor light sources.

Figure 23:
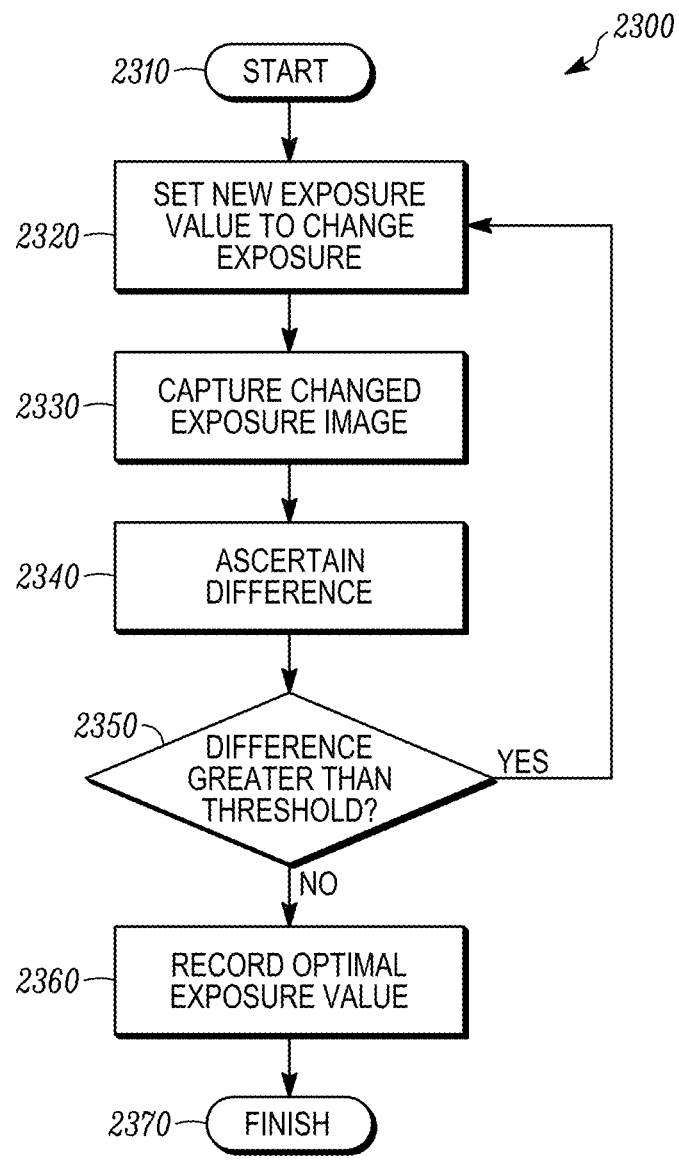
FIG. 23 is an example flowchart illustrating the operation of a user device according to a possible embodiment.

FIG. 23 is an example flowchart 2300 illustrating the operation of a user device, such as the user device 110, according to a possible embodiment. The flowchart 2300 can illustrate an operation for finding an optimal exposure value from an initial image that has been previously captured, such as a preview image. At 2310, the flowchart 2300 can begin. At 2320 a new exposure value can be set to change the exposure of a current iteration of an image. For example, an exposure from a previous iteration can be changed by at least a fraction of an exposure value. The exposure can be changed positively or negatively. At 2330, a changed exposure image can be captured at the currently set exposure value. At 2340, a difference between an exposure data metric of the current iteration of the changed exposure image and an exposure data metric of a previous iteration of the image can be ascertained. At 2350, the difference between the exposure data metric of the current iteration of the changed exposure image and the exposure data metric of the previous iteration of the image can be compared to a difference threshold. If the difference is greater than the difference threshold, then the flowchart can return to 2320. The process may also run for searching the optimal exposure value of the low exposure image or the high exposure image. The low exposure image and the high exposure image can be used for an HDR image. If the difference is less than or equal to the difference threshold, at 2360, the resulting optimal exposure value can be recorded. At 2370, the flowchart can end.

Figure 24:
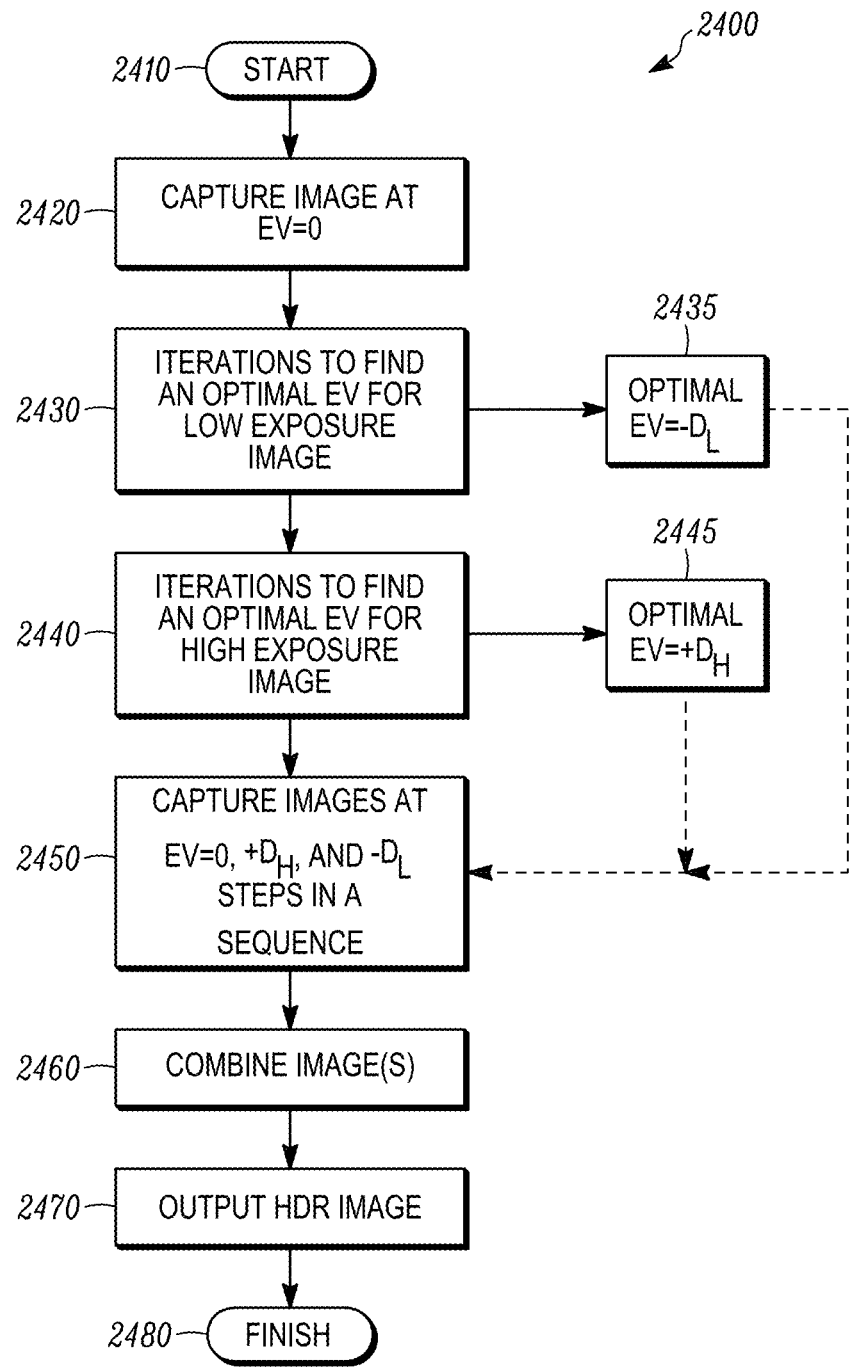
FIG. 24 is an example flowchart illustrating the operation of a user device according to a possible embodiment.

FIG. 24 is an example flowchart 2400 illustrating the operation of a user device, such as the user device 110, according to a possible embodiment. The flowchart 2400 can illustrate an overall HDR image capture process. At 2410, the flowchart 2400 can begin. At 2420, an image, such as a preview image, can be captured as a captured image at a capture exposure EV=0. At 2430, iterations can be performed to find an optimal EV for capturing a low exposure image. For example, the flowchart 2300 can be used to determine the optimal EV and the optimal EV can be recorded as $-D_L$ at 2435 for use later at 2450. At 2440, iterations can be performed to find an optimal EV for capturing a high exposure image. For example, the flowchart 2300 can be used to determine the optimal EV and the optimal EV can be recorded as $+D_H$ at 2445 for use later at 2450. At 2450, different exposure images can be captured in sequence using the normal exposure EV=0, the optimal low exposure EV=$-D_L$, and the optimal high exposure EV=$+D_H$. According to a possible implementation three images can be captured. According to another possible implementation, two different exposure images can be captured, such as by using 2-capture HDR or sensor HDR. Different numbers of images can be captured at different exposures depending on the type of HDR being generated. At 2460, the different exposure images can be combined to generate an HDR image. At 2470, the HDR image can be output. For example, the HDR image can be output to a display, output to a memory, output via a transceiver, output via a network connection, output to a printer, or output to any other element that is useful for outputting or using an image. At 2480, the flowchart 2400 can end.

Figure 25:
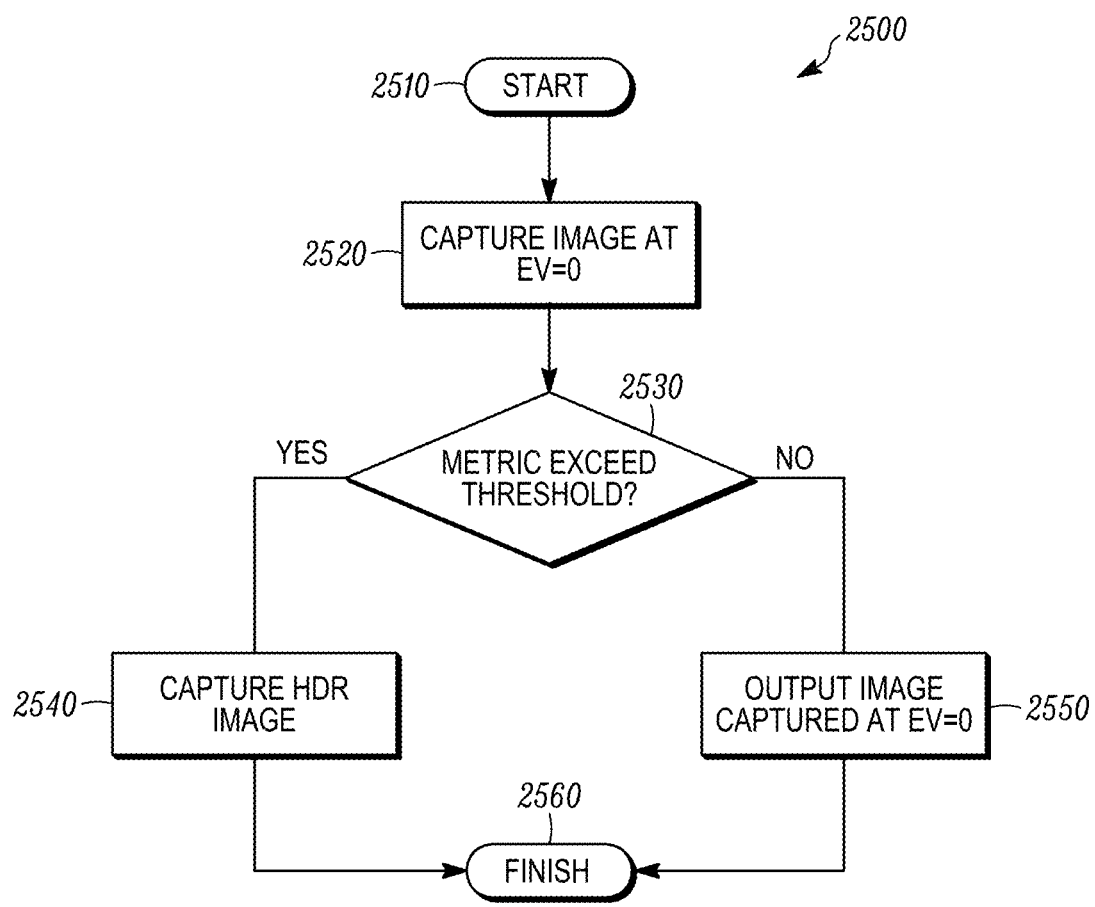
FIG. 25 is an example flowchart illustrating the operation of a user device according to a possible embodiment.

FIG. 25 is an example flowchart 2500 illustrating the operation of a user device, such as the user device 110, according to a possible embodiment. The flowchart 2500 can illustrate decision logic used to determine whether an HDR image should be captured. At 2510, an image can be captured at a normal exposure EV=0. At 2520, a determination can be made as to whether an initial exposure data metric of the captured image exceeds an initial threshold. If the initial exposure data metric exceeds the initial threshold, then the flowchart 2400 can be performed to capture and output an HDR image. If the initial exposure data metric is less than or equal to the initial threshold, the HDR image is not necessary, and at 2555 the image can be output. Alternately, a user can determine an HDR image is desired regardless of whether the initial metric exceeds the initial threshold and the flowchart 2500 can be bypassed and the flowchart 2400 can be performed. At 2450, the flowchart 2400 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 26:
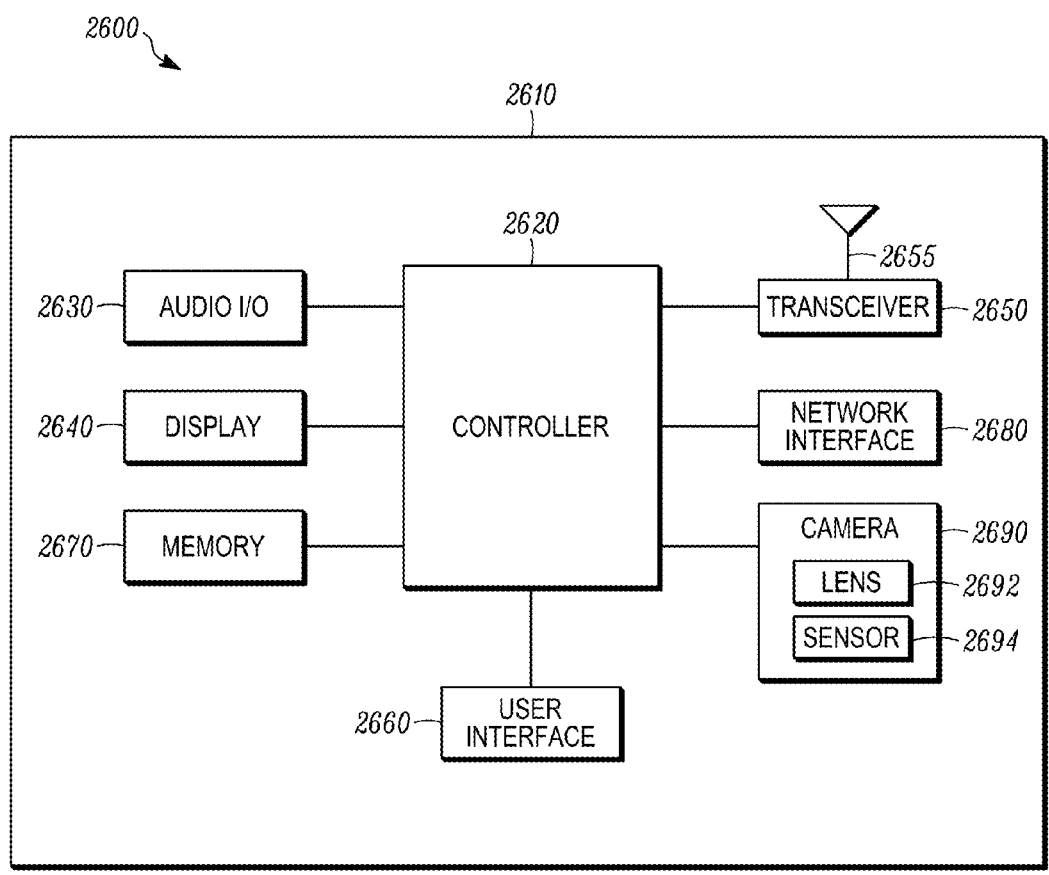
FIG. 26 is an example block diagram of an apparatus according to a possible embodiment.

FIG. 26 is an example block diagram of an apparatus 2600, such as the user device 110, according to a possible embodiment. The apparatus 2600 can include a housing 2610, a controller 2620 within the housing 2610, audio input and output circuitry 2630 coupled to the controller 2620, a display 2640 coupled to the controller 2620, a transceiver 2650 coupled to the controller 2620, an antenna 2655 coupled to the transceiver 2650, a user interface 2660 coupled to the controller 2620, a memory 2670 coupled to the controller 2620, and a network interface 2680 coupled to the controller 2620. The apparatus 2600 can also include a camera 2690 and the camera 2690 can include a lens 2692 and a sensor 2694. The apparatus 2600 may include other elements or may not include some of the illustrated elements depending on how the apparatus 2600 is implemented as user device. The apparatus 2600 can perform the methods described in all the embodiments.

The display 2640 can be a viewfinder, a liquid crystal display (LCD), a light emitting diode (LED) display, a plasma display, a projection display, a touch screen, or any other device that displays information. The transceiver 2650 can include a transmitter and/or a receiver. The audio input and output circuitry 2630 can include a microphone, a speaker, a transducer, or any other audio input and output circuitry. The user interface 2660 can include a keypad, a keyboard, buttons, a touch pad, a joystick, a touch screen display, another additional display, or any other device useful for providing an interface between a user and an electronic device. The network interface 2680 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 2670 can include a random access memory, a read only memory, an optical memory, a flash memory, a removable memory, a solid state memory, a hard drive, a cache, or any other memory that can be coupled to a user device.

The apparatus 2600 or the controller 2620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 2670 or elsewhere on the apparatus 2600. The apparatus 2600 or the controller 2620 may also use hardware to implement disclosed operations. For example, the controller 2620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 2420 may be any controller or processor device or devices capable of operating an electronic device and implementing the disclosed embodiments.

In operation, the camera 2690 can capture an image as a captured image at a capture exposure value. The controller 2620 can change the exposure of a current iteration of the image by at least a fraction of an exposure value. The controller 2620 can change the exposure by adjusting a sensor gain of the sensor 2694, by adjusting a shutter speed, by adjusting a lens 2692 aperture, or by any other operation for changing an exposure value.

The controller 2620 can capture a changed exposure image at the changed exposure value via the camera 2690. The controller 2620 can ascertain a difference between an exposure data metric of the current iteration of the changed exposure image and an exposure data metric of a previous iteration of the image. The controller 2620 can compare the difference between the exposure data metric of the current iteration of the changed exposure image and the exposure data metric of the previous iteration of the image to a difference threshold. The controller 2620 can repeat changing the exposure value, capturing the changed exposure image, ascertaining the difference, and comparing the difference when the difference between the exposure data metric of the current iteration of the changed exposure image and the exposure data metric of the previous iteration of the image exceeds the difference threshold. The controller 2620 can combine the captured image with the changed exposure image of an upper limit of exposure value, the changed exposure image of a lower limit of exposure value, or both to generate a high dynamic range image based on a final exposure value of the changed exposure image, in an upper limit or a lower limit search, when the difference between the second exposure data metric of the current iteration of the changed exposure image and the second exposure data metric of the previous iteration of the image does not exceed the difference threshold. The apparatus 2600 can then output the high dynamic range image into the memory 2670, onto the display 2640, via the transceiver 2650, via the network interface 2680, or by any other element useful for outputting an image.

According to a possible embodiment, the exposure data metric can be a value at an end of a luminance channel histogram and the difference threshold can be an amount of a difference between the value at the end of the luminance channel histogram between the current iteration of the changed exposure image and the previous iteration of the image. According to a possible implementation of this embodiment, the end of the luminance channel histogram can be a white end of the luminance channel histogram and the controller 2620 can change the exposure by decreasing the exposure of the image by at least a fraction of an exposure value step. According to another possible implementation of this embodiment, the end of the luminance channel histogram comprises a black end of the luminance channel histogram and the controller 2620 can change the exposure by increasing the exposure of the image by at least a fraction of an exposure value step.

According to another possible embodiment, the exposure data metric can be a contrasting area in a threshold binary image and the difference threshold can be a difference between the size of the contrasting areas of the current iteration of the changed exposure image and the size of the contrasting areas of the previous iteration of the image. The controller 2620 can generate the threshold binary image by comparing a luminance value of each pixel in the image to a binary image threshold, setting a pixel as a black pixel if the luminance value of the pixel is below the binary image threshold, and setting the pixel as a white pixel if the luminance value of the pixel is above the binary image threshold. According to a possible implementation of this embodiment, the threshold binary image can be a high-threshold binary image and the exposure data metric can be one or more white areas in a high-threshold binary image. Then, the controller 2420 can change the exposure by decreasing the exposure of the image by at least a fraction of an exposure value step if the difference between the size of those white areas of a previous iteration of the image and the size of those white areas of a current iteration of the image exceeds the threshold. According to another possible implementation of this embodiment, the threshold binary image can be a low-threshold binary image and wherein the exposure data metric can be one or more black areas in a low-threshold binary image. Then, the controller 2620 can change the exposure by decreasing the exposure of the image by at least a fraction of an exposure value step if the difference between the size of those black areas of a previous iteration of the image and the size of those black areas of a current iteration of the image exceeds the threshold.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. A method comprising:
capturing an image as a captured image at a capture exposure value;
changing the exposure of a current iteration of the image by at least a fraction of an exposure value;
capturing a changed exposure image at the changed exposure value;
ascertaining a difference between an exposure data metric of the current iteration of the changed exposure image and an exposure data metric of a previous iteration of the image;
comparing the difference between the exposure data metric of the current iteration of the changed exposure image and the exposure data metric of the previous iteration of the image to a difference threshold; and
repeating changing the exposure value, capturing the changed exposure image, ascertaining the difference, and comparing the difference when the difference between the exposure data metric of the current iteration of the changed exposure image and the exposure data metric of the previous iteration of the image exceeds the difference threshold.

2. The method according to claim 1, wherein the capture exposure value is determined by an automatic exposure algorithm for a current scene.

3. The method according to claim 1, wherein changing includes increasing the exposure value to search an upper limit of exposure value for a dynamic range of a current scene, and decreasing the exposure value to search for a lower limit of exposure value for the dynamic range of the current scene.

4. The method according to claim 1,
wherein the exposure data metric comprises a first exposure data metric,
wherein the method further comprises, prior to changing the exposure:
determining if a second exposure data metric of the captured image exceeds a second threshold; and
when the second exposure data metric exceeds the second threshold, performing the changing the exposure, the capturing the changed exposure image, ascertaining the difference, and comparing the difference.

5. The method according to claim 1, further comprising:
combining an image captured with the capture exposure value with at least one changed exposure image to generate a high dynamic range image based on a final exposure value of the at least one changed exposure image when the difference between the exposure data metric of the current iteration of the changed exposure image and the exposure data metric of the previous iteration of the image does not exceed the difference threshold; and
outputting the high dynamic range image.

6. The method according to claim 5, further comprising:
performing decreasing the exposure value, capturing the changed exposure image, ascertaining the difference, and comparing the difference for a low exposure value;
performing increasing the exposure value, capturing the changed exposure image, ascertaining the difference, and comparing the difference for a high exposure value; and
capturing, in sequence, an image captured using the capture exposure value, an image captured using the high exposure value, and an image captured using the low exposure value,
wherein combining the image captured using the capture exposure value, the image captured using the high exposure value, and the image captured using the low exposure value to generate the high dynamic range image.

7. The method according to claim 1,
wherein the exposure data metric comprises a value at an end of a luminance channel histogram of a captured image, and
wherein the difference threshold comprises an amount of a difference between the value at the end of the luminance channel histogram between the current iteration of the changed exposure image and the previous iteration of the image.

8. The method according to claim 7,
wherein the end of the luminance channel histogram of a captured image comprises a white end of the luminance channel histogram, and
wherein changing comprises decreasing the exposure value of the image by at least a fraction of an exposure value step.

9. The method according to claim 7,
wherein the end of the luminance channel histogram of a captured image comprises a black end of the luminance channel histogram, and
wherein changing comprises increasing the exposure of the image by at least a fraction of an exposure value step.

10. The method according to claim 1,
wherein the exposure data metric comprises a contrasting area in a threshold binary image of a captured image, and
wherein the difference threshold comprises a difference between the size of the contrasting area of the current iteration of the changed exposure image and the size of the contrasting area of the previous iteration of the image.

11. The method according to claim 10, further comprising generating the threshold binary image of an captured image by comparing a luminance value of each pixel in the image to a binary image threshold, setting a pixel as a black pixel if the luminance value of the pixel is below the binary image threshold, and setting the pixel as a white pixel if the luminance value of the pixel is above the binary image threshold.

12. The method according to claim 10,
wherein the threshold binary image of a captured image comprises a high-threshold binary image,
wherein the exposure data metric comprises at least one white area in a high-threshold binary image, and
wherein changing comprises decreasing the exposure of the image by at least a fraction of an exposure value step if the difference between the size of those white areas of a previous iteration of the image and the size of those white areas of a current iteration of the image exceeds the threshold.

13. The method according to claim 10,
wherein the threshold binary image of a captured image comprises a low-threshold binary image, and
wherein the exposure data metric comprises at least one black areas in a low-threshold binary image, and
wherein changing comprises increasing the exposure of the image by at least a fraction of an exposure value step if the difference between the size of those black areas of a previous iteration of the image and the size of those black areas of a current iteration of the image exceeds the threshold.

14. An apparatus comprising:
a camera configured to capture an image as a captured image at a capture exposure value; and
a controller configured to:
change the exposure of a current iteration of the image by at least a fraction of an exposure value,
capture a changed exposure image at the changed exposure value via the camera,
ascertain a difference between an exposure data metric of the current iteration of the changed exposure image and an exposure data metric of a previous iteration of the image,
compare the difference between the exposure data metric of the current iteration of the changed exposure image and the exposure data metric of the previous iteration of the image to a difference threshold, and
repeat changing the exposure value, capturing the changed exposure image, ascertaining the difference, and comparing the difference when the difference between the exposure data metric of the current iteration of the changed exposure image and the exposure data metric of the previous iteration of the image exceeds the difference threshold.

15. The apparatus according to claim 14, wherein the capture exposure value is determined by an automatic exposure algorithm for a current scene.

16. The apparatus according to claim 14, wherein the controller is configured to change the exposure of a current iteration by increasing the exposure value to search for an upper limit of the exposure value for a dynamic range of the current scene and decreasing the exposure value to search for a lower limit of exposure value for the dynamic range of the current scene.

17. The apparatus according to claim 14,
wherein the controller is configured to combine the an image captured at the capture exposure value with at least one changed exposure image to generate a high dynamic range image based on a final exposure of the at least one changed exposure image when the difference between the second exposure data metric of the current iteration of the changed exposure image and the second exposure data metric of the previous iteration of the image does not exceed the difference threshold, and
wherein the apparatus further comprises an output configured to output the high dynamic range image.

18. The apparatus according to claim 17, wherein the controller is configured to perform decreasing the exposure value, capturing the changed exposure image, ascertaining the difference, and comparing the difference for a low exposure value, configured to perform increasing the exposure value, capturing the changed exposure image, ascertaining the difference, and comparing the difference for a high exposure value, configured to capture, in sequence, an image captured using the capture exposure value, an image captured using the high exposure value, and an image captured using the low exposure value, and configured to combine the image captured using the capture exposure value, the image captured using the high exposure value, and the image captured using the low exposure value to generate the high dynamic range image.

19. The apparatus according to claim 14,
wherein the exposure data metric comprises a value at an end of a luminance channel histogram of a captured image, and
wherein the difference threshold comprises an amount of a difference between the value at the end of the luminance channel histogram between the current iteration of the changed exposure image and the previous iteration of the image.

20. The apparatus according to claim 19,
wherein the end of the luminance channel histogram of a captured image comprises a white end of the luminance channel histogram, and
wherein the controller is configured to change the exposure value by decreasing the exposure of the image by at least a fraction of an exposure value step.

21. The apparatus according to claim 19,
wherein the end of the luminance channel histogram of a captured image comprises a black end of the luminance channel histogram, and
wherein the controller is configured to change the exposure by increasing the exposure of the image by at least a fraction of an exposure value step.

22. The apparatus according to claim 14,
wherein the exposure data metric comprises at least one contrasting area in a threshold binary image of a captured image, and
wherein the difference threshold comprises a difference between the size of the at least one contrasting area of the current iteration of the changed exposure image and the size of the at least one contrasting area of the previous iteration of the image.

23. The apparatus according to claim 22, wherein the controller is configured to generate the binary image by comparing a luminance value of each pixel in the image to a binary image threshold, setting a pixel as a black pixel if the luminance value of the pixel is below the binary image threshold, and setting the pixel as a white pixel if the luminance value of the pixel is above the binary image threshold.

24. The apparatus according to claim 22,
wherein the threshold binary image comprises a high-threshold binary image of a captured image,
wherein the exposure data metric comprises at least one white area in a high-threshold binary image, and
wherein the controller is configured to change the exposure by decreasing the exposure of the image by at least a fraction of an exposure value step if the difference between the size of the at least one white area of a previous iteration of the image and the size of the at least one white area of a current iteration of the image exceeds the threshold.

25. The apparatus according to claim 22,
wherein the threshold binary image of a captured image comprises a low-threshold binary image,
wherein the exposure data metric comprises at least one black area in a low-threshold binary image, and
wherein the controller is configured to change the exposure by increasing the exposure of the image by at least a fraction of an exposure value step if the difference between the size of the at least one black area of a previous iteration of the image and the size of the at least one black area of a current iteration of the image exceeds the threshold.

26. A method comprising:
- capturing an image as a captured image at a capture exposure value determined by an auto exposure algorithm for the current scene;
- determining if a first exposure data metric of the captured image exceeds a first threshold;
- when the first exposure data metric exceeds the first threshold:
  - changing the exposure of a current iteration of the image by at least a fraction of an exposure value, where changing includes increasing the exposure value to search an upper limit of exposure value for the dynamic range of the current scene, and decreasing the exposure value to search for a lower limit of exposure value for the dynamic range of the current scene;
  - capturing a changed exposure image at the changed exposure value;
  - ascertaining a difference between a second exposure data metric of the current iteration of the changed exposure image and a second exposure data metric of a previous iteration of the image;
  - comparing the difference between the second exposure data metric of the current iteration of the changed exposure image and the second exposure data metric of the previous iteration of the image to a difference threshold; and
  - repeating changing the exposure, capturing the changed exposure image, ascertaining the difference, and comparing the difference when the difference between the second exposure data metric of the current iteration of the changed exposure image and the second exposure data metric of the previous iteration of the image exceeds the difference threshold; and
- combining an image captured at the capture exposure value with at least one changed exposure image to generate a high dynamic range image based on a final exposure of the at least one changed exposure image when the difference between the second exposure data metric of the current iteration of the changed exposure image and the second exposure data metric of the previous iteration of the image does not exceed the difference threshold; and
- outputting the high dynamic range image.

* * * * *